(12) United States Patent
Henderson

(10) Patent No.: US 8,502,111 B2
(45) Date of Patent: Aug. 6, 2013

(54) LASER WOODWORKING MACHINE

(76) Inventor: Charles L. Henderson, Marietta, GA (US)

( * ) Notice: Subject to any disclaimer, the term of this patent is extended or adjusted under 35 U.S.C. 154(b) by 0 days.

(21) Appl. No.: 13/283,545

(22) Filed: Oct. 27, 2011

(65) Prior Publication Data
US 2012/0037274 A1 Feb. 16, 2012

Related U.S. Application Data

(63) Continuation-in-part of application No. 11/501,333, filed on Apr. 12, 2007, now abandoned.

(51) Int. Cl.
*B23K 26/00* (2006.01)

(52) U.S. Cl.
USPC ............ 219/121.67; 219/121.75; 219/121.78; 219/121.82

(58) Field of Classification Search
USPC ............... 219/121.6, 121.67, 121.72, 121.78, 219/121.83; 144/2.1
See application file for complete search history.

(56) References Cited

U.S. PATENT DOCUMENTS

| | | | |
|---|---|---|---|
| 3,664,389 A | 5/1972 | Bower | |
| 3,741,674 A | 6/1973 | Witzig | |
| 4,184,395 A * | 1/1980 | Blachly et al. | ............... 83/486.1 |
| 4,211,134 A | 7/1980 | Thorsell | |
| 4,641,557 A | 2/1987 | Steiner | |
| 4,661,680 A | 4/1987 | Swensrud | |
| 4,808,791 A | 2/1989 | Puozzo | |
| 4,851,637 A | 7/1989 | Puozzo | |
| 4,884,939 A * | 12/1989 | Nielsen | ......................... 414/698 |
| 4,895,144 A | 1/1990 | Cook | |
| 4,973,819 A | 11/1990 | Thatcher | |
| 5,122,635 A * | 6/1992 | Knodler et al. | .......... 219/121.63 |
| 5,229,572 A | 7/1993 | Ito | |
| 5,229,573 A | 7/1993 | Stone | |
| 5,287,780 A | 2/1994 | Metzger | |
| 6,160,835 A * | 12/2000 | Kwon | ........................... 372/108 |
| 6,163,010 A | 12/2000 | Kobsa | |
| 6,388,231 B1 * | 5/2002 | Andrews | ................. 219/121.69 |
| 6,601,426 B2 | 8/2003 | Wegener | |
| 6,755,064 B2 | 6/2004 | Butscher | |
| 2004/0031911 A1 * | 2/2004 | Hoffmann et al. | ....... 250/227.19 |

* cited by examiner

*Primary Examiner* — Brian Jennison
(74) *Attorney, Agent, or Firm* — Jones IP Law, LLC; Dennis W. Jones

(57) ABSTRACT

A laser woodworking machine for cutting wood is disclosed. The machine includes a laser cutting head having two sections structurally configured to include sensors for measurements of depth and of reflected frequencies, a laser unit for supplying power to the laser cutting head, a cabinet enclosure for housing the laser unit and including a table surface, a radial arm supported by a column secured to the inside rear portion of the cabinet enclosure and including a pair of radial supports extending perpendicularly from opposite sides of the column and parallel to each other, and a glider carriage secured to the radial supports and including two substantially flat surfaces above and below the radial supports so that the glider carriage slides along the radial supports via sleeves, the glider carriage further comprising support for the laser cutting head so that the laser cutting head is moveable along the radial arm.

11 Claims, 10 Drawing Sheets

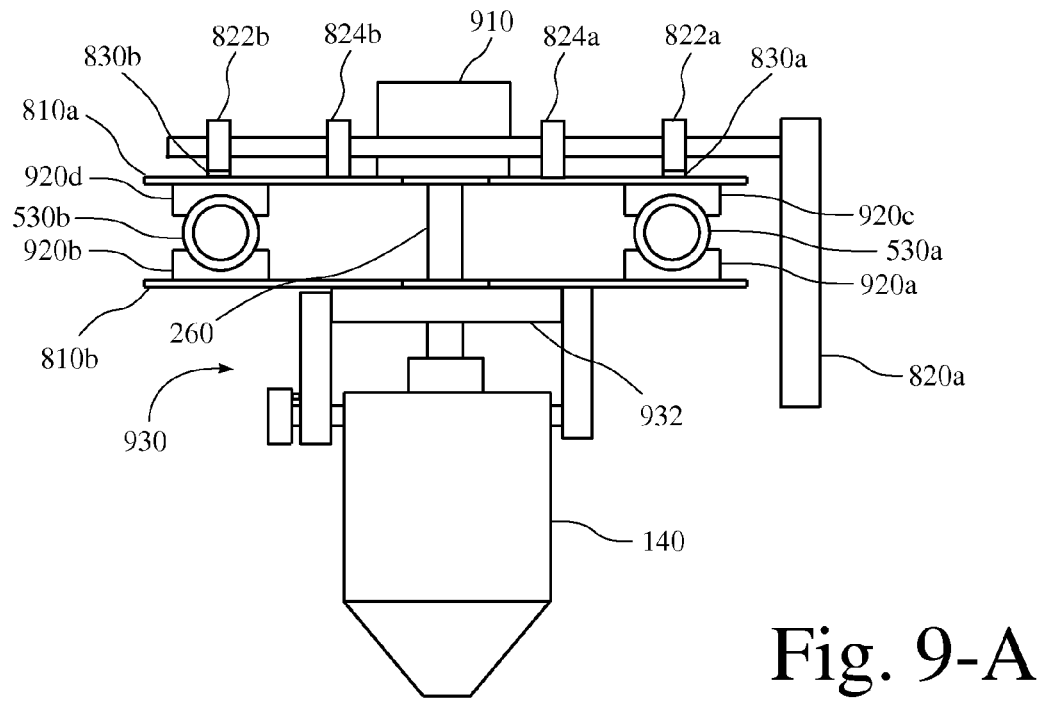
Fig. 9-A
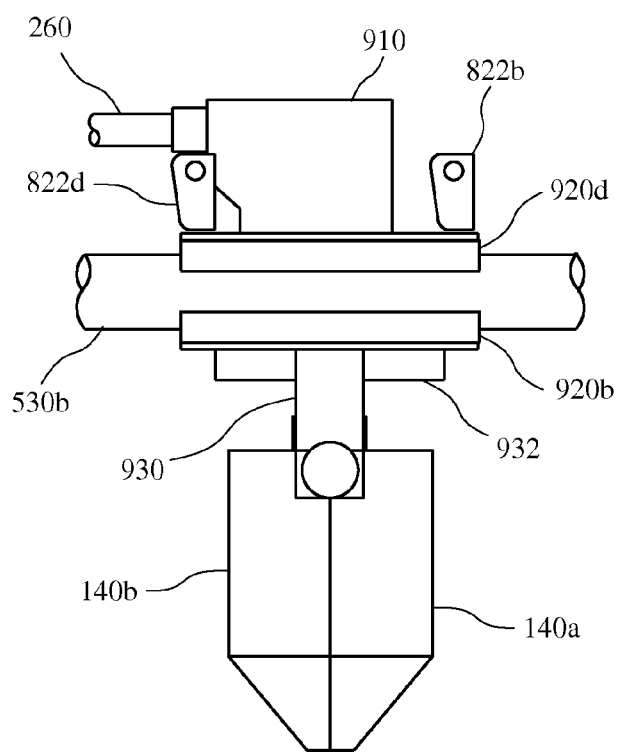
Fig. 9-B

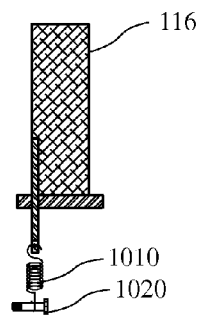
Fig. 10-A
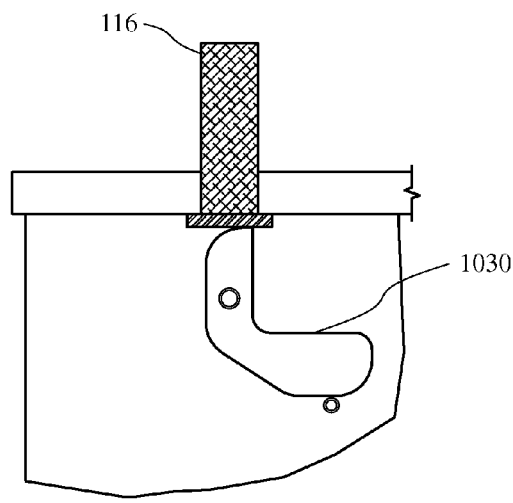
Fig. 10-B
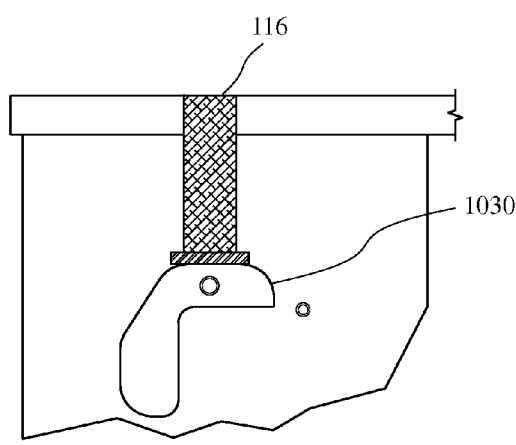
Fig. 10-C

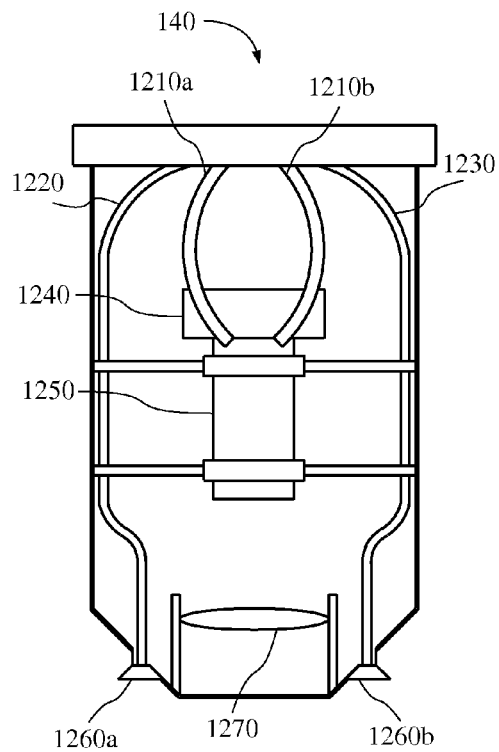
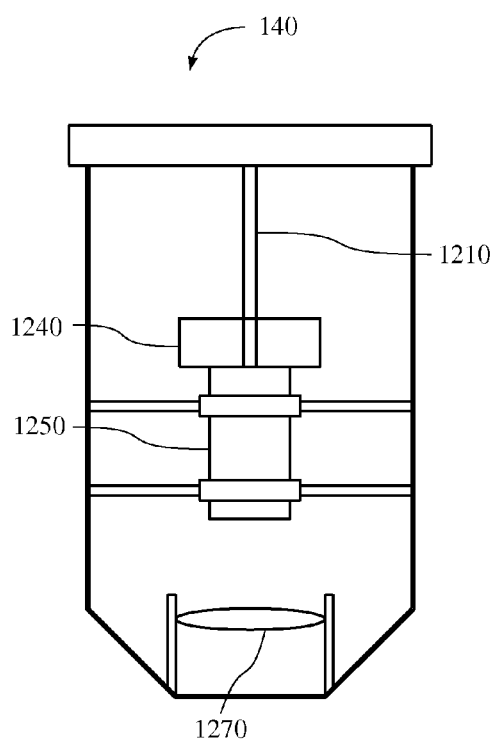
Fig. 12-A    Fig. 12-B
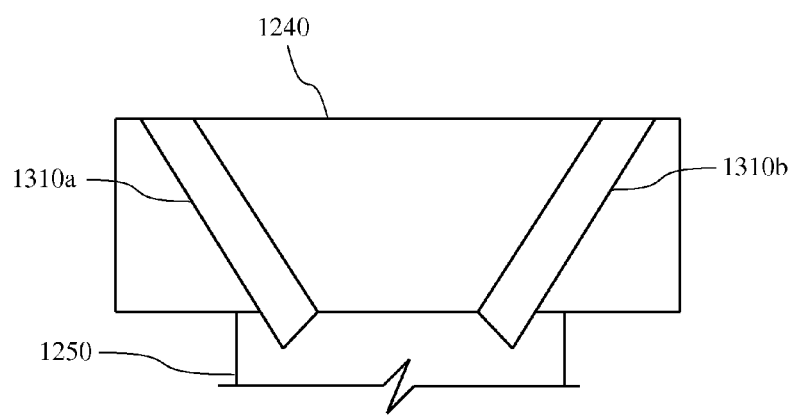
Fig. 13

LASER WOODWORKING MACHINE

CROSS-REFERENCE TO RELATED APPLICATIONS

This application is a continuation-in-part of prior application Ser. No. 11/501,333, filed Apr. 12, 2007, which is incorporated herein by reference as if set forth herein in its entirety.

BACKGROUND

1. Field of Invention

This invention is generally related to woodworking and, more particularly, is related to an machine from which a laser beam is directed for making precise wood cuts.

2. Description of the Related Art

Traditional power tools for woodworking are very dangerous due to the amount and velocity of the moving parts. Due to size and power usage, laser cutting tools for woodworking and the like, if they can be found, are often cumbersome and not very easy or straightforward to use. Such tools are often large, non-portable assemblies that are not useful or affordable for hobbyists and do-it-yourself home maintenance types.

What is needed is an affordable device that has reasonable space requirements. Such a device could be used for many types of woodworking and similar projects while also improving the safety environment for the user.

BRIEF SUMMARY

According to one embodiment of the present invention, a laser woodworking machine for cutting wood is provided. The machine provides (1) a laser cutting head having two sections structurally configured to include sensors for measurements of depth and of reflected frequencies, and to combine a cutting beam and a light beam for monitoring a cut, (2) a variable power laser unit for supplying power to the laser cutting head, (3) a control panel for controlling the variable power output from the laser unit for variable depth of cut according to the power variation of the laser unit, (3) a cabinet enclosure for housing the laser unit, the cabinet enclosure including a table surface, (4) a radial arm supported by a column secured to the inside rear portion of the cabinet enclosure, wherein the radial arm includes a pair of steel pipes extending perpendicularly from opposite sides of the column and parallel to each other, and (5) a glider carriage secured to the radial supports having two substantially flat surfaces above and below the radial supports so that the glider carriage slides along the radial supports via nylon sleeves, the glider carriage further comprising support for the laser cutting head, wherein the laser cutting head is moveable along the radial arm.

Another embodiment discloses a laser cutting head having two sections structurally configured to include sensors for measurements of depth and of reflected frequencies, a laser unit for supplying power to the laser cutting head, a cabinet enclosure for housing the laser unit and including a table surface, a radial arm supported by a column secured to the inside rear portion of the cabinet enclosure and including a pair of radial supports extending perpendicularly from opposite sides of the column and parallel to each other, and a glider carriage secured to the radial supports and including two substantially flat surfaces above and below the radial supports so that the glider carriage slides along the radial supports via sleeves, the glider carriage further comprising support for the laser cutting head so that the laser cutting head is moveable along the radial arm.

BRIEF DESCRIPTION OF THE SEVERAL VIEWS OF THE DRAWINGS

The above-mentioned features will become more clearly understood from the following detailed description read together with the drawings in which:

FIG. 9-A is a front view of the laser cutting head attached to the support yoke and glider carriage.

FIG. 9-B is a side view of the laser cutting head attached to the support yoke and glider carriage.

FIG. 10-A is an end view of one embodiment of an adjustable fence assembly with a spring attachment.

FIG. 10-B is an illustration of the fence assembly in an open position.

FIG. 10-C is an illustration of the fence assembly in a closed position.

FIG. 12-A and FIG. 12-B are respective views of the inside of a laser cutting head.

FIG. 13 is one embodiment of an aiming bracket for the laser cutting head.

DETAILED DESCRIPTION

A machine for laser woodworking is disclosed. The machine provides precise woodcuts via a directed laser beam.

Figure 1:
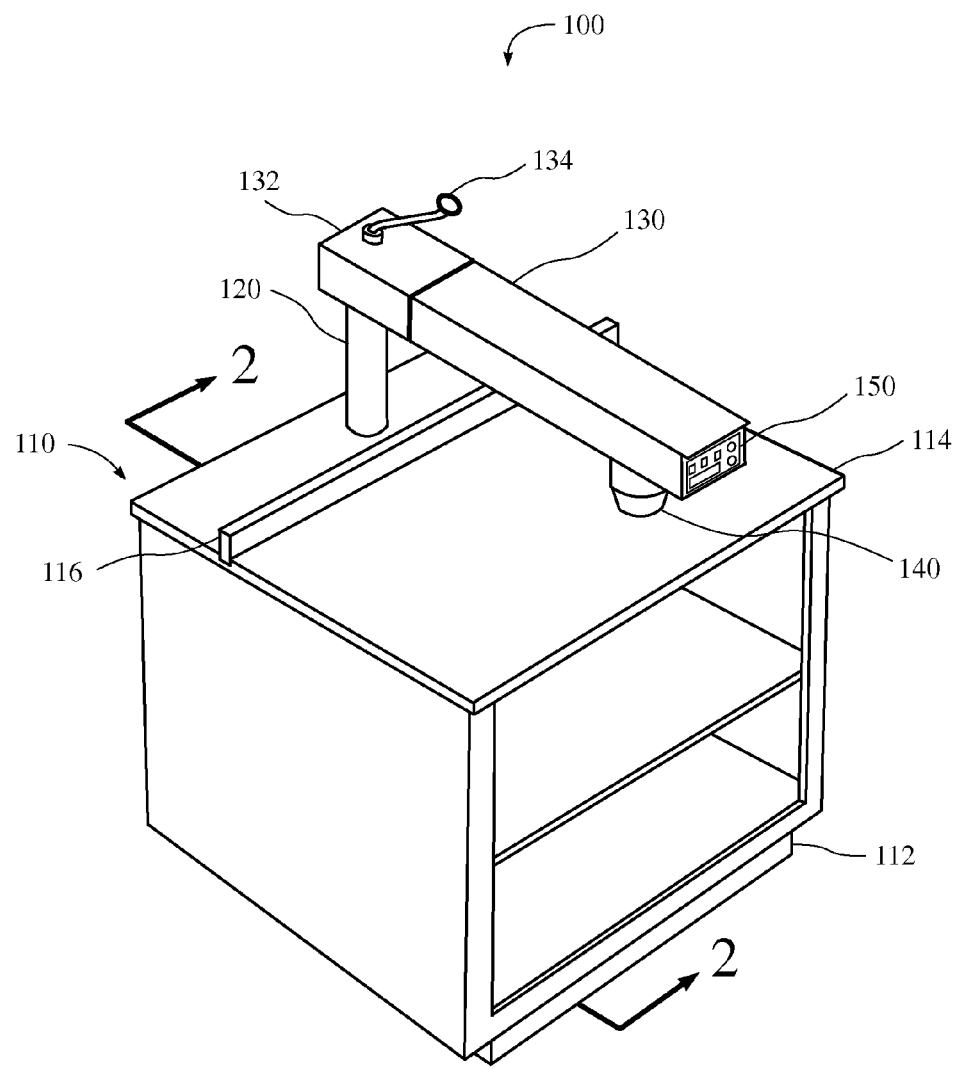
FIG. 1 is a perspective view of a laser woodworking machine according to the present invention.
Figure 2:
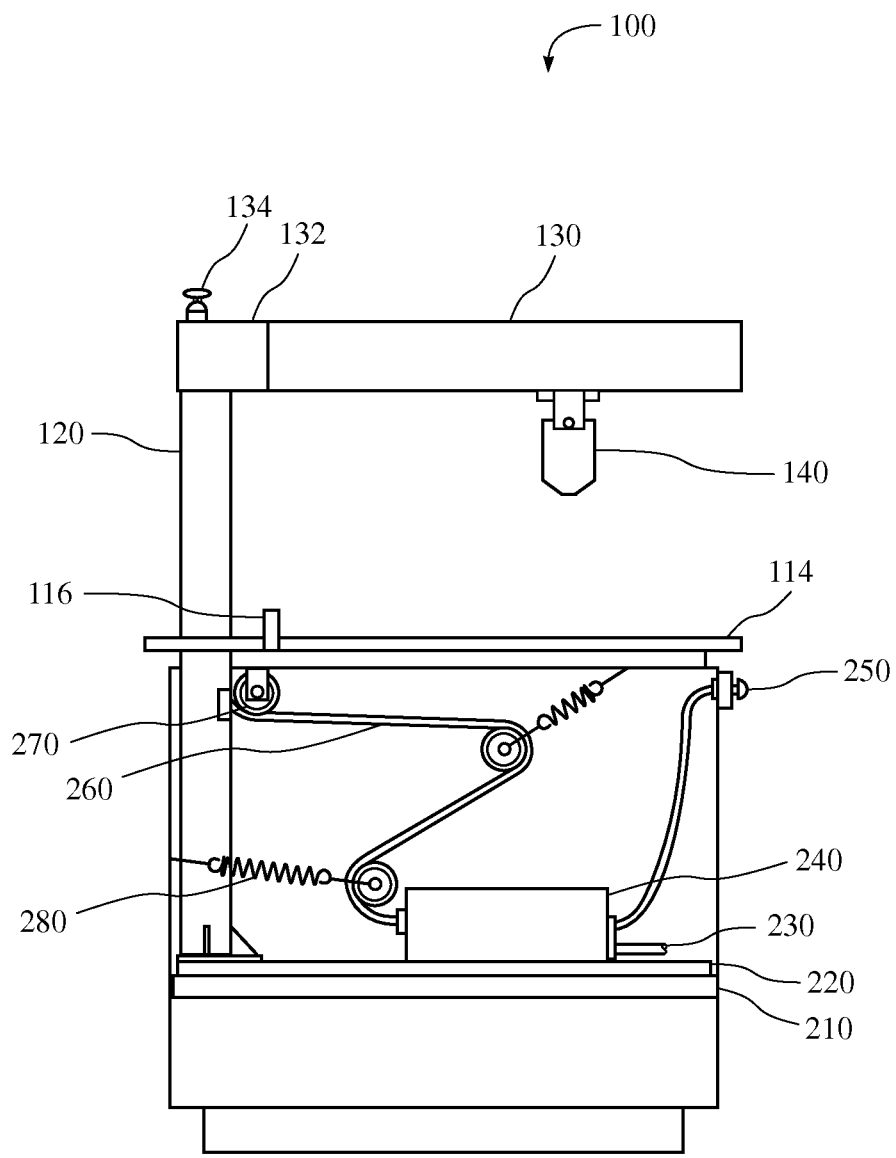
FIG. 2 is a side view of the laser woodworking machine of FIG. 1 and of the interior of a cabinet enclosure of the laser woodworking machine.

FIG. 1 is a perspective view of one embodiment of a laser woodworking machine 100. The laser woodworking machine 100 includes a cabinet enclosure 110, a cabinet base 112, a support column 120, a radial arm 130, a laser head 140, and a control panel 150. The cabinet enclosure 110 typically also includes doors (not shown) or the like for enclosing the front of the cabinet enclosure 110 as well as providing access to the inside of the cabinet. In some embodiments, the cabinet enclosure 110 includes an openable and/or detachable panel to cover the front access opening. FIG. 2 is a side view of one embodiment of the laser woodworking machine 100 and also shows the interior of the cabinet enclosure 110.

The machine 100 is quiet and simple to use while also providing for precise and sanding free woodworking. The laser beam cuts to an exact depth with fine cuts that are smooth and ready for joining or finishing. Energy use is small in comparison to conventional woodworking tools. Since, there are no powered moving parts, the machine 100 provides improved safety. Frequency adjustable sensors react only to the detection of flesh to provide instant disconnection of power from the device to reduce or eliminate risk to users, whether they are skilled or unskilled.

The cabinet enclosure 110 is free standing upon the cabinet base 112 and is self-ventilated. In one embodiment, the cabinet enclosure 110 is a NEMA Type I steel enclosure and includes doors attached via hinges. In such a cabinet enclosure 110, at least one fan is typically included within the enclosure. Vent openings are typically located on both sides and on the rear. In one embodiment, the vent openings are louvered as necessary for air circulation around the laser and the power supply. The number of vent openings in the cabinet enclosure 110 may be increased or decreased according to the specific cooling requirements.

In another embodiment, the cabinet enclosure is small enough to rest upon a counter-top or workbench. In one embodiment, power is provided to the cabinet enclosure 110 from the rear. In various embodiments, the cabinet enclosure 110 is mounted on casters, legs, and the like.

In one embodiment the cabinet enclosure 110 is of conventional welded steel construction. Those of skill in the art will readily appreciate that multiple types of framing may be used to ensure a rigid assembly of the cabinet enclosure 110. In various embodiments access to the interior of the cabinet enclosure 110 is provided via a door located on either or both sides of the front of the cabinet enclosure 110 wherein the door(s) are attached via hinges of sufficient strength to support the weight of the door(s).

The laser woodworking machine 100 includes a table surface 114 above the cabinet enclosure 110. The table surface 114 typically covers the entirety of the area immediately above the cabinet enclosure 110. The table surface 114 is made from any material that is suitable as a woodworking surface. In one embodiment, the table surface 114 is made of welded steel secured via welding to the cabinet enclosure 110. Those of skill in the art will readily appreciate that other materials may also serve as a suitable table surface 114. An adjustable fence 116 is located at the rear of the table surface 114. The fence 116 is used as a guide or to position the wood or other material that is being cut by the laser woodworking machine 100. The fence 116 can also be lowered so that the cutting surface is substantially smooth.

Turning again to FIG. 2, the interior of the cabinet enclosure 110 includes an enclosure shelf 220 resting upon support channels (or struts) 210. In the illustrated embodiment, there are four (4) support channels 210 (see FIG. 4). Other embodiments may include more or less than four support channels 210 to support an enclosure shelf 220. A laser (and power) unit 240 is situated on the enclosure shelf 220 and receives power from a power input 230. The power input 230 is typically supplied through the rear (not shown) of the cabinet enclosure 110. An emergency shutoff 250 is located at the front of the cabinet enclosure 110 just below the table surface 114. The emergency shutoff 250 provides capability for the user to instantly disconnect the power from the machine 100. In one embodiment the emergency shutoff 250 is a pushbutton for ease of activation (to remove power).

The laser unit 240 includes a standard Nd:YAG flash pumped solid state type laser or a sealed gas CO2 type laser. The laser includes a variable power output. The laser output includes a visible beam, such as a red laser for example, that is used for positioning of the object within the cutting path. The laser also includes a cutting laser beam that is non-visible or invisible. The non-visible laser beam is positioned with the visible beam.

A cable 260 is routed from the laser unit 240, through the support column 120, through the radial arm 130, and into the laser head 140. In one embodiment, the cable 260 includes two fiber-optics and two copper wires. The cable 260 is secured within the cabinet enclosure 110 via a series of pulleys 270 and springs 280 that provide tension to prevent the cable from crimping and such like when the height of the radial arm 130 is adjusted. The cable then extends through the support column 120 to the radial arm 130.

The radial arm 130 is attached at one end to the support column 120. A radial arm cover 132 is positioned to cover the radial arm 130 at the end that connects with the support column. A lever 134 extends from the support column 120 for adjusting the height of the radial arm 130. Additionally, the radial arm 130 pivots around the support column to provide for adjusting the position of the laser head within the available cutting area of the laser woodworking machine 100.

Figure 3:
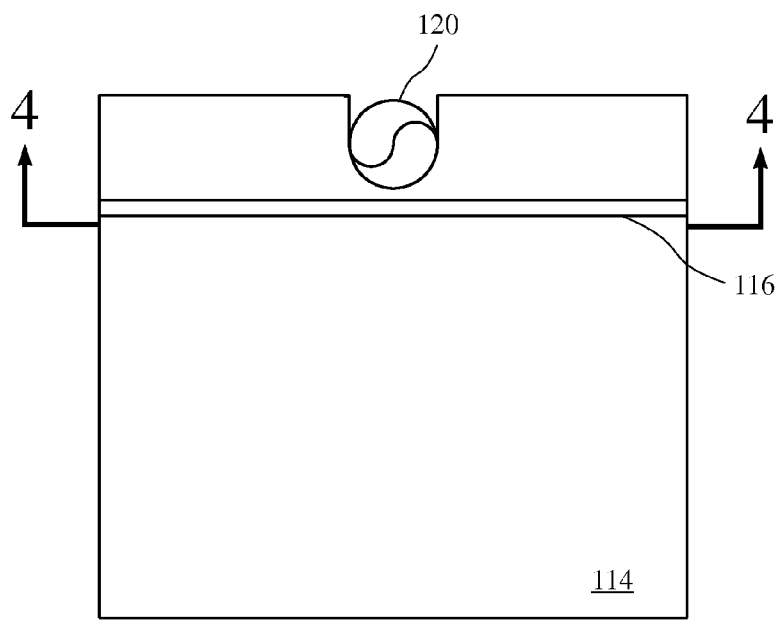
FIG. 3 is a top view of a table surface of the laser woodworking machine.
Figure 4:
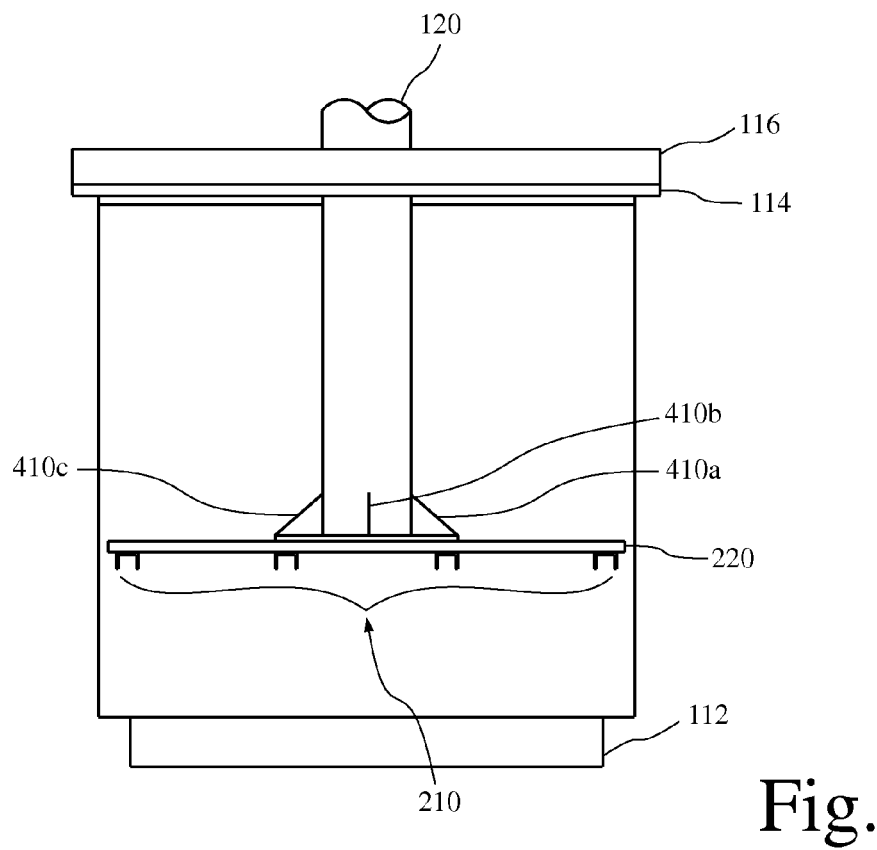
FIG. 4 is a front view of a support column within the cabinet enclosure of the laser woodworking machine of FIG. 1.

FIG. 3 illustrates a top view of the table surface 114 of the laser woodworking machine 100. The support column 120 is located at the rear of the machine 100 beyond the fence 116. FIG. 4 is a front view of the support column 120 within the cabinet enclosure 110. The base of the support column 120 rests upon the enclosure shelf 220. Three brackets or stiffeners 410a, 410b, 410c at approximately 90° angles from each other secure the support column 120 to the enclosure shelf 220. In one embodiment, the stiffeners 410 are situated toward the front and to either side of the cabinet enclosure. No stiffener 410 or bracket is necessary at the rear of the cabinet enclosure 110 since the rear of the support column 120 is adjacent to the rear of the cabinet enclosure 110.

In the illustrated embodiment, four support channels 210 (or struts) provide support for the enclosure shelf 210. Those of skill in the art will appreciate that the number of support channels 210 and their spacing may be varied according to the strength necessary for the enclosure shelf 220 to support the support column 120, the laser unit 240, as well as any additional items that may optionally be placed on the enclosure shelf 220.

Figure 5:
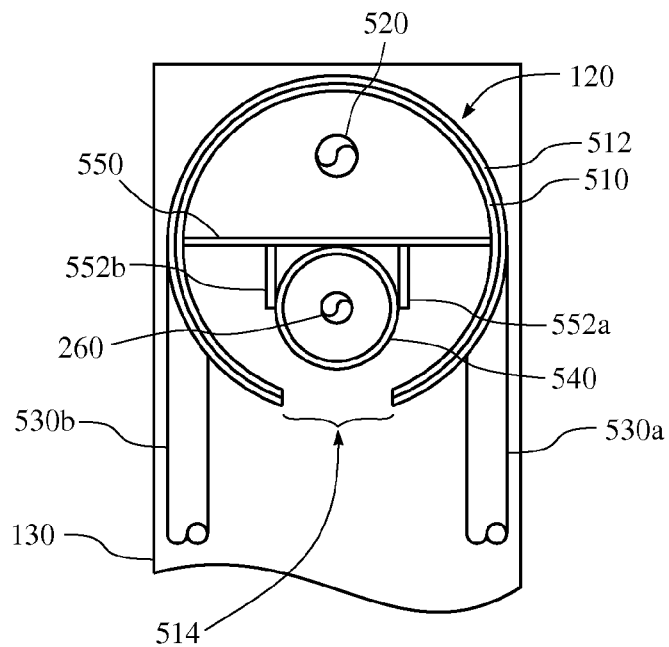
FIG. 5 is a top view of the support column of FIG. 4.
Figure 6:
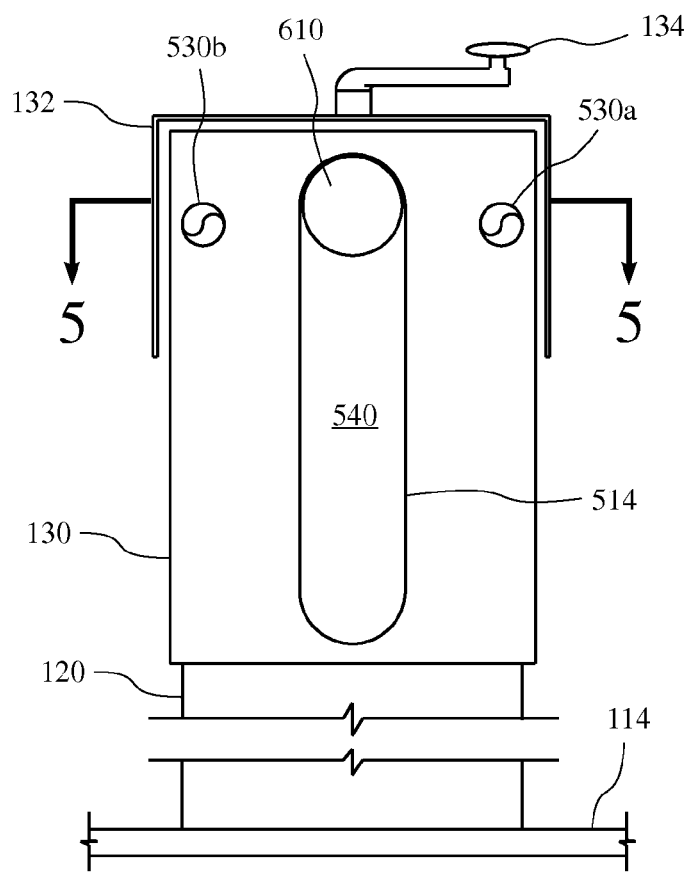
FIG. 6 is a front view of a cable slot of the support column of FIG. 5.

FIG. 5 is a top view of the support column 120 that extends from the interior of the cabinet enclosure 110 to the radial arm 130. FIG. 6 is a front view of a cable slot of the support column 120 and looking in toward the point where FIG. 5 is looking down the support column 120.

As noted above, one end of the radial arm 130 is attached to the support column 120. The support column 120 includes an inner portion 510 and a sleeve 512 adjacent to the inner portion 510. Within the inner portion 510 are a threaded rod 520, a tube 540, a shield plate 550, and stabilizers 552a, 552b. In one embodiment, the stabilizers 552 are welded to both the shield plate 550 and to the tube 540 to provide for maximum stability of the tube 540. One or more cables pass through the tube 540. In one embodiment, a single cable 260 that includes both fiber-optics and copper wire provides for delivery to the laser head and to the control panel.

Figure 7:
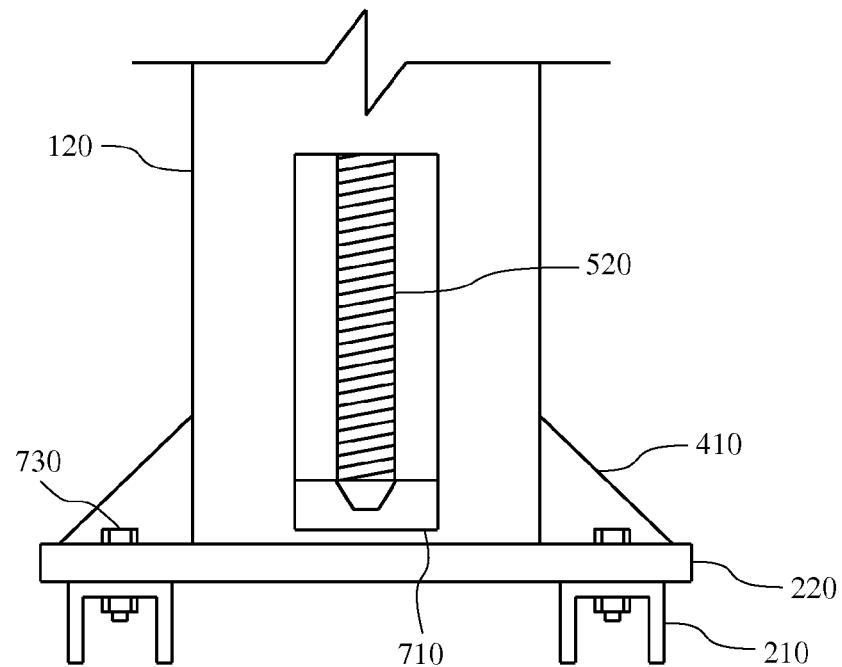
FIG. 7 is a side view of a threaded rod within the support column for adjusting the height of a radial arm of the laser woodworking machine.

The lever 134 attaches to the threaded rod 520 that extends downward through the support column to a base (see FIG. 7). The lever provides for turning the rod 520 to adjust the height of the radial arm 130, and thus the height of the laser head 140, above the table surface 114. A tube 540 within the support column 120 provides a passageway for the cable 260 that passes from the laser unit 240 to the radial arm 130.

Two radial supports 530a, 530b extend from opposite sides of the column support 120 and through the radial arm 130. The radial supports 530 provide the structural support for the weight of the radial arm 130, and also for the laser head 140. In one embodiment, the radial supports 530 are steel pipes of a sufficient size and strength to support the combined weight of the radial arm 130 and the laser head 140. In another embodiment, the radial supports 530 are rods of sufficient size and strength to support the combined weight of the radial arm 130 and the laser head 140, as above. In one embodiment, one end of each radial support 530 is welded to the support column 120 on opposite sides of the outer sleeve 512.

An elongated slot 514 in the support column 120 adjacent the end of the radial arm 130 provides an opening to the tube 540 through which the cable 260 passes. The cable 260 passes through the tube 540, out a cable opening 610 and through the slot 514 into the radial arm 130. The slot 514 allows for the up and down movement of the support column 120.

FIG. 7 is a side view of the threaded rod 520 within the support column 120. The threaded rod 520 is used to move the support column 120 up or down to adjust the height of the radial arm 130. The threaded rod 520 is received by a threaded rod base 710. The threaded rod base 710 is of sufficient height to allow the rod 520 to be withdrawn sufficient distance to increase the height of the radial arm 130 above the table surface 114 without the threaded rod 520 becoming unstable.

Figure 8:
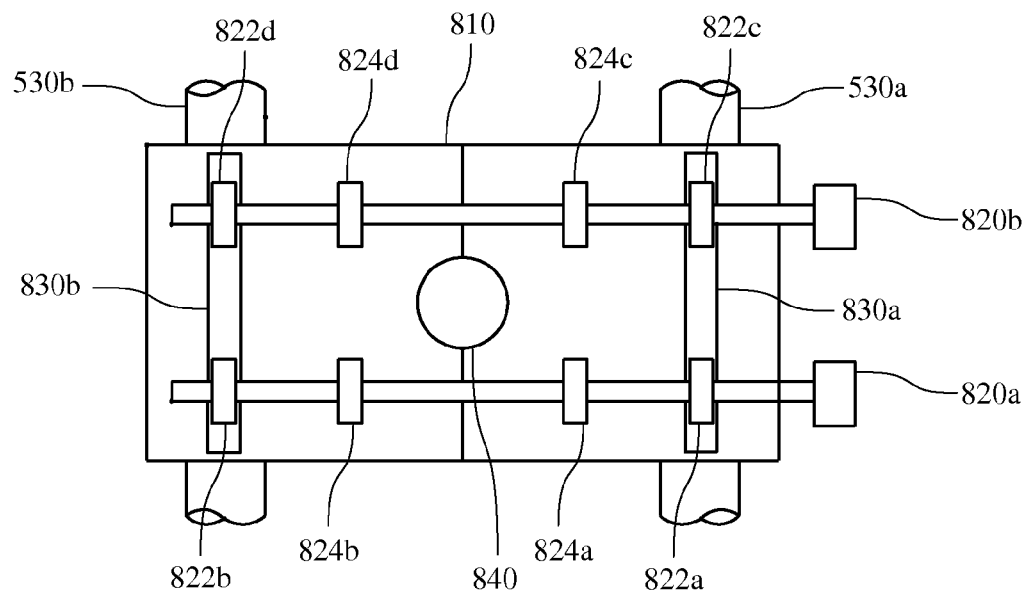
FIG. 8 is a top view of a support yoke and glider carriage for a laser cutting head.

FIG. 8 is a top view of a glider carriage 810 for a support yoke and a laser head 140. The glider carriage 810 is supported by and secured to the radial supports 530a, 530b for movement of the laser head 140 along the radial arm 130. The glider carriage 810 includes stop levers 820a, 820b one of which includes a handle for securing the glider carriage 810 in place and releasing it for movement along the radial supports 530a, 530b. Each stop lever 820 includes wheels 822 and cams 824. The wheels 822a, 822b, 822c, 822d operate upon blocks 830a, 830b. The blocks 830 include friction elements to hold the wheels in place when the glider carriage 810 is tightened against the radial supports 530a, 530b. In one embodiment, the blocks 830 include teeth such that the teeth press against the wheels 822 to prevent motion.

The glider carriage 810 is secured in place against the radial supports 530 via turning the handle attached to one of the stop levers 820. In the illustrated embodiment, the stop lever 820a serves as the handle. It should be readily appreciated that either stop lever 820a, 820b could be the handle. Upon turning the handle, the cams 824a, 824b, 824c, 824d are rotated in so that the longer portion of each cam 824 pushes down to tighten the glider carriage 810 against the radial supports 530a, 530b.

The glider carriage 810 also includes a carriage opening 840 through which a cable passes for connection to the laser head 140 and the control panel 150.

FIG. 9-A is a front view of the laser head 140 attached to the support yoke 930 and the glider carriage 810. FIG. 9-B is side view of the laser head 140 as attached to the support yoke 930 and the glider carriage 810. A housing 910 is affixed to the upper portion of the glider carriage 810. The support yoke 930 is attached to a turntable 932 on the underside of the glider carriage 810. Nylon sleeves 920a, 920b, 920c, 920d are affixed between the glider carriage 810 and the radial supports 530a, 530b on the upper and lower sides of each radial support 530. When the cams 824 are disengaged, the nylon sleeves facilitate the ease of movement for the glider carriage 810.

The cable 260 passes through the radial arm 130 and connects to the housing 910. The cable 260 exits the underside of the housing 910 through the carriage opening 840 (FIG. 8) and extends to the laser head 140.

The front view of the glider carriage 810 illustrates how the cams 824 cause the upper and lower portions of the glider carriage 810a, 810b to compress as the cams 824 push against each portion. As each cam 824 applies pressure to the glider carriage 810a, 810b, the nylon sleeves 920 press against the radial supports 530 to hold the glider carriage 810 in place.

In one embodiment, the laser head 140a, 140b has two sections made from a suitable composite material. In one such embodiment, assembly is via machine screw or similar fastening and securing mechanisms. It will be readily appreciated by those of skill in the art that deformations to the laser head 140 are typically necessary to house the beam combiner and focusing lenses. In one embodiment, screw type threads are formed into the laser head 140 for initial lens adjustment, after which the threads are intentionally burred to prevent movement of the lenses within the laser head 140.

The laser head 140 also includes deformations for the mounting of sensors that can detect when skin is in the path of the cutting laser beam.

The top portion of the laser head 140 is mounted in a support yoke 930. Fine adjustment of cutting angle is provided for with a turntable 930 that includes stops at 30°, 45°, and 60°. The support yoke 920 and turntable 930 are attached to the glider carriage 810 on the radial arm 130.

FIG. 10-A is an end view of one embodiment of an adjustable fence assembly 116 with a spring attachment 1010. FIG. 10-B shows an illustration of the fence 116 in an open position. FIG. 10-C is an illustration of the fence 116 in operation. As noted above, the fence 116 is located at the rear of the table surface 114. The fence 116 is adjustable to lower the fence 116 so that the table surface 114 is substantially smooth.

The spring mechanism 1010 is held in place inside the cabinet enclosure 110 via a fastener 1020, such as a screw, for example. The fence handle 1030 is operable to increase and decrease the tension on the spring 1010 to open or close the fence assembly.

Figure 11:
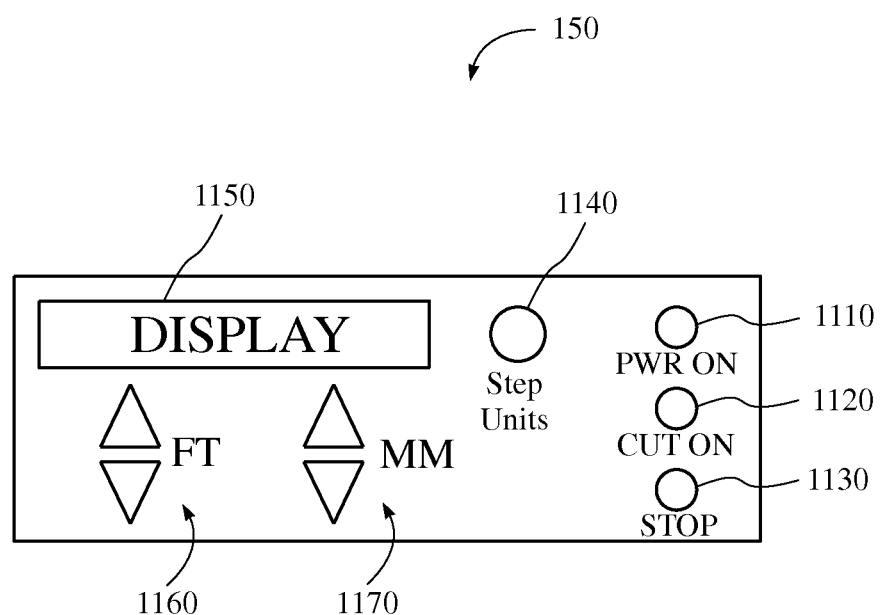
FIG. 11 is one embodiment of a control panel for use with the laser woodworking machine.

FIG. 11 is one embodiment of a control panel 150 for use with the laser woodworking machine 100. In the illustrated embodiment, the control panel 150 is located at the end of the radial arm 130. In the illustrated embodiment, the control panel 150 is a solid-state device that is preprogrammed for controlling the woodworking machine 100. In one embodiment, the control panel 150 includes an industrial film type sealed keypad. The control panel 150 includes a key for PWR ON 1110, a key for CUT ON 1120, and a key for STOP 1130. The PWR ON key 1110 is operable to provide power to the guide (aiming) laser. The CUT ON key 1120 provides power to the cutting laser or the laser head 140. The STOP key 1130 removes or turns off all power to the laser woodworking machine 100.

As noted above, an emergency shutoff switch 250 is mounted on the front of the cabinet enclosure 110 for quick removal of the power. The control panel 150 also has capability for removing power from the machine 100 via the STOP key 1130

During operation, the control panel is operable to select the cutting depth via the FT key 1160, or the MM key 1170, depending on the desired measuring system. In one embodiment, the control panel provides capability for measuring the cutting depth from 1/128 inch through 9 inches via increments of 1/128 inch. The control panel 150 varies the power output of the cutting laser to achieve the specific cutting depth that is chosen via the controls. That is, the operating power range of the cutting laser is varied to achieve the desired depth of cut. Those of skill in the art will readily appreciate that the precision and depth of the cut is merely a matter of the desired pre-programming of the control unit and of the capability of the instruments. The "Step Units" key 1140 is operable to select the unit size for adjustment. In this way, the adjustments to the desired cut can be made in larger or smaller increments at a time. That is, the power adjustment has a course and a fine adjustment for quicker setup.

The control panel 150 is programmed to determine the measured cutting depth via sensors that are utilize sensing beams for measuring the distance of the laser head 140 above the table surface 114.

The display 1150 indicates the present cut setting via the value and also the units. Of course, other information can also be displayed according to need.

FIG. 12-A and FIG. 12-B are respective views of the inside of a laser cutting head or laser head 140. FIG. 13 is one embodiment of an aiming bracket 1230 for the laser cutting head 140. The laser head 140 includes optical fiber 1210*a*, 1210*b*, a sensing beam 1220, a light beam 1230, an aiming bracket 1240, a beam combiner 1250, spreaders 12601, 1260*b*, and focusing lenses 1270.

In one embodiment, the laser head 140*a*, 140*b* has two sections made from a suitable composite material. In one such embodiment, assembly is via machine screw or similar fastening and securing mechanisms. It will be readily appreciated by those of skill in the art that deformations to the laser head 140 are typically necessary to house the beam combiner and focusing lenses. In one embodiment, screw type threads are formed into the laser head 140 for initial lens adjustment, after which the threads are intentionally burred to prevent movement of the lenses within the laser head 140.

The beam combiner 1240 is fixed within the laser head 140, and not adjustable. In one embodiment, the beam combiner 1240 is located in-line with the fiber and is within the cabinet enclosure 110.

The fiber weld joints of the fiber slots are angle cut to merge the beams within the aiming bracket 1240. The aiming bracket 1240 directs the fiber so that the laser beams are properly delivered to the polarization beam chamber 1250.

The laser head 140 is assembled in a manner that provides for movement by hand directly to the laser head 140 or via a handle attached to the laser head 140.

The laser head 140 also includes sensors for detecting human flesh. Four proximity switches detect whether human flesh is within the proximity of the laser cutting beam. The proximity switches turn the laser power beam off upon detection of flesh. The switches respond to frequencies that are not reflected by flesh only. That is when a frequency appears that is reflected by flesh, the proximity switches remove power from the laser cutting beam. The proximity switches operate when the cutting beam has power.

Figure 14:
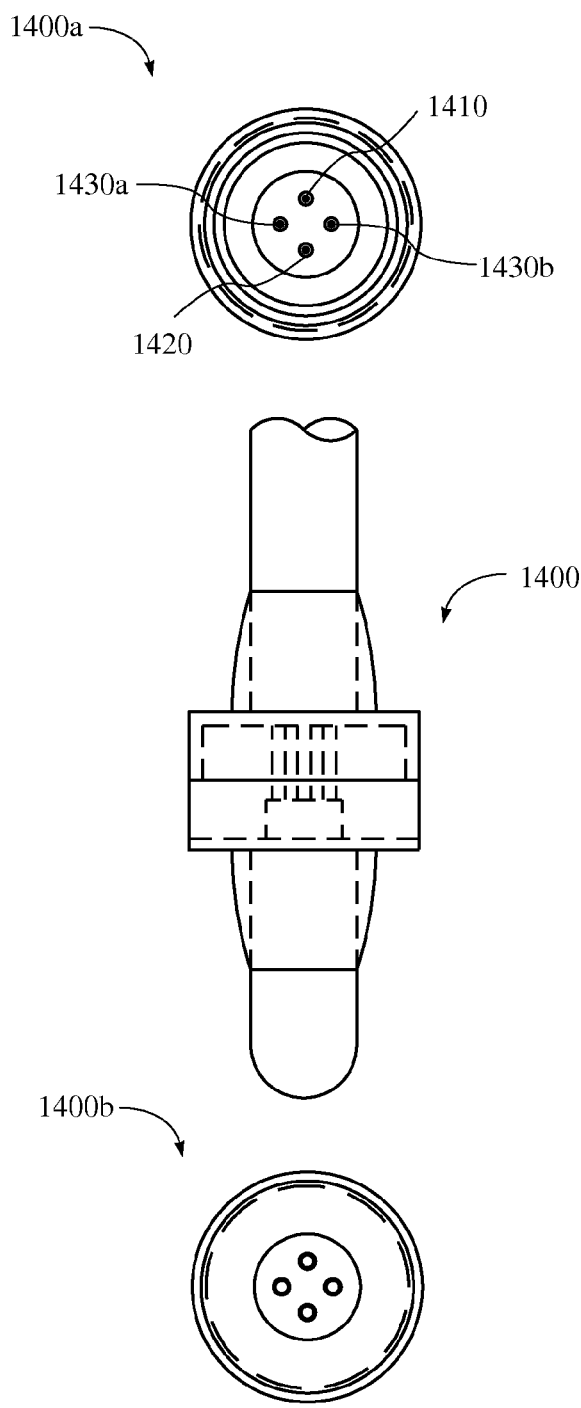
FIG. 14 is an illustration of a fiber cable connector.

FIG. 14 is an illustration of a fiber cable connector 1400. The fiber cable connector 1400*a*, 1400*b* is used for connecting the fiber from the laser unit 240 to the laser head 140. In the illustrated embodiment, the fiber cable connector 1400*a* includes a laser cutting beam fiber 1410, a visible beam fiber 1420, and two sensing beam fibers 1430*a*, 1430*b*. Those of skill in the art will readily appreciate that more or less fibers may be used for delivery to the laser head 140, as well as optionally providing the control signals to and from the control panel 150.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A laser woodworking machine for cutting wood, the laser woodworking machine comprising:
    a laser cutting head, the laser cutting head including two sections, the two sections including a depth sensor for measurement of depth of cut, and including a plurality of proximity sensors for detection of at least one target reflected frequency, so that power is removed upon detection of a target reflected frequency corresponding to human flesh;
    a laser unit for supplying power to the laser cutting head;
    a cabinet enclosure for housing the laser unit, the cabinet enclosure including a table surface;
    a single radial arm supported by a column secured to inside rear portion of the cabinet enclosure, the single radial arm comprising:
        a pair of radial support arms extending perpendicularly from opposite sides of the column and parallel to each other; and
        a control panel at end of the single radial arm opposite the column, the control panel operable for selecting cutting depth; and
    a glider carriage secured to the radial support arms via sleeves, wherein the glider carriage includes two substantially flat surfaces above and below the radial support arms so that the glider carriage slides along the radial support arms via the sleeves, the glider carriage further comprising support for the laser cutting head, and wherein the glider carriage further includes a stop lever rod having at least one vertically oriented wheel and at least one vertically oriented cam operable to press the glider carriage against the sleeves to secure the glider carriage in place,
    wherein the laser cutting head is moveable along the single radial arm.

2. The laser woodworking machine of claim 1 wherein the control panel is operable for varying the power from the laser unit to provide variable depth of cut.

3. The laser woodworking machine of claim 1 wherein the sleeves are nylon sleeves.

4. The laser woodworking machine of claim 1 wherein the glider carriage further comprises at least one wheel block, each wheel block corresponding to each vertically oriented wheel, wherein the stop lever rod is further operable to press the at least one vertically oriented wheel against each corresponding wheel block to provide friction against respective wheel to secure the glider carriage in place.

5. The laser woodworking machine of claim 1 wherein the laser unit is a variable power laser unit.

6. The laser woodworking machine of claim 5 wherein the laser cutting head is further configured for variable depth of cut according to the power variation of the laser unit.

7. The laser woodworking machine of claim 1 wherein the laser cutting head is further configured to combine a cutting beam and a light beam for monitoring of wood cutting.

8. The laser woodworking machine of claim 1 further comprising a support yoke, wherein the laser cutting head is secured to the glider carriage via the support yoke.

9. The laser woodworking machine of claim 8 wherein the support yoke further comprises a turntable for rotating the laser cutting head.

10. The laser woodworking machine of claim 1 wherein the radial support arms are selected from one of the following: steel pipes, steel rod.

11. A laser woodworking machine for cutting wood, the laser woodworking machine comprising:
- a laser cutting head, the laser cutting head including two sections, the two sections including a depth sensor for measurement of depth of cut and including a plurality of proximity sensors for detection of at least one target reflected frequency, so that power is removed upon detection of a target reflected frequency corresponding to human flesh, and wherein the laser cutting head combines a cutting beam and a light beam for monitoring a cut;
- a variable power laser unit for supplying power to the laser cutting head;
- a control panel for controlling the variable power output from the laser unit, wherein the laser cutting head is configured for variable depth of cut according the power variation of the laser unit;
- a cabinet enclosure for housing the laser unit, the cabinet enclosure including a table surface;
- a single radial arm supported by a column secured to inside rear portion of the cabinet enclosure, the single radial arm comprising:
  - a pair of radial support arms extending perpendicularly from opposite sides of the column and parallel to each other; and
  - a control panel at end of the radial arm opposite the column, the control panel operable for selecting cutting depth; and
- a glider carriage secured to the radial support arms via nylon sleeves, wherein the glider carriage includes two substantially flat surfaces above and below the radial support arms so that the glider carriage slides along the radial support arms via the nylon sleeves, the glider carriage further comprising support for the laser cutting head, and wherein the glider carriage further includes a stop lever rod having at least one vertically oriented wheel and at least one vertically oriented cam operable to press the glider carriage against the sleeves to secure the glider carriage in place, wherein the laser cutting head is moveable along the radial arm.

* * * * *